(12) United States Patent
Millet et al.

(10) Patent No.: US 7,246,368 B1
(45) Date of Patent: Jul. 17, 2007

(54) CABLE PLANT CERTIFICATION PROCEDURE USING CABLE MODEMS

(75) Inventors: Mark E. Millet, Mountain View, CA (US); Guenter E. Roeck, San Jose, CA (US); Chrisanto Leano, San Jose, CA (US); James A. Clark, Cumming, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/493,405

(22) Filed: Jan. 28, 2000

(51) Int. Cl.
*H04N 7/16* (2006.01)

(52) U.S. Cl. .................. 725/111; 725/107; 370/241

(58) Field of Classification Search ............. 725/107, 725/124, 125, 121, 108, 111, 126; 348/192, 348/193
See application file for complete search history.

(56) References Cited

U.S. PATENT DOCUMENTS

| | | | |
|---|---|---|---|
| 5,862,451 A | 1/1999 | Grau et al. | |
| 5,939,887 A * | 8/1999 | Schmidt et al. | 324/628 |
| 5,943,604 A | 8/1999 | Chen et al. | |
| 6,772,437 B1 * | 8/2004 | Cooper et al. | 725/111 |

OTHER PUBLICATIONS

Data-Over-Cable Service Interface Specifications, SP-RFI-I05-991105.*

* cited by examiner

*Primary Examiner*—Chris Kelley
*Assistant Examiner*—James Sheleheda
(74) *Attorney, Agent, or Firm*—Beyer Weaver LLP

(57) ABSTRACT

A system for testing a cable network during normal operation interleaves test signals with live data traffic. Installed cable modems are used to generate the test signals. During live communication, such modems send upstream data at allotted time periods. Periodically, there are time slots when no modem is transmitting on the network. During these times, specific modems may be directed to transmit specific test signals. A controller such as a cable modem termination system directs specific modems to transmit signals at defined frequencies and powers during specific time slots. In this manner, the system can monitor the frequency response of the cable network at various locations, and thereby determine "on-the-fly" when maintenance or modification is required.

28 Claims, 6 Drawing Sheets

CABLE PLANT CERTIFICATION PROCEDURE USING CABLE MODEMS

BACKGROUND OF THE INVENTION

This invention relates to systems and methods for determining whether a cable network is compliant with a set of standards for two-way data communication.

In cable network systems (e.g., a hybrid fiber-coaxial (or HFC) plant), digital data is carried over radio frequency (RF) carrier signals. At the interfaces of a cable network are cable modems. These devices modulate digital data for "upstream" transmission on a broadband media and demodulate modulated RF signals for "downstream" reception of digital data.

Cable networks are composed of passive and active devices, each having a particular attenuation and frequency response. The overall frequency and amplitude response of a cable network system varies nearly continually. Cable lines are installed in new geographic areas, new cable modems and components are installed on existing segments of the network, the condition of existing lines deteriorates or improves, the performance of amplifiers, splitters, etc. changes, and so on. If the condition of the overall cable network or some subsection of it deteriorates below certain physical margins, the system may become partially or wholly unusable. Because cable plants are large, complex, and dynamic, it is very difficult to model or predict their performance.

Currently, cable networks are tested for compliance with particular two-way communication standards before cable modems are brought on-line. The testing typically involves defining an "X" point at or near the network's "headend" and then monitoring the frequency and power of signals received at that point. To evaluate the behavior of the entire network, signals are transmitted from numerous points on the cable network. Testing may be accomplished by putting a frequency analyzer at point "X" and then causing test signals to be generated at various locations on the network. These test signals may be provided by a specialized piece of apparatus that connects to the system at particular locations. The apparatus may generate test signals at, for example, 45 dBmV scanned over a frequency range of 5-42 MHz, a standard frequency range for upstream data communications in cable networks. The spectrum analyzer at point "X" records the amplitude versus power spectrum it receives from the source of the signal. This gives some indication of the frequency response of the cable network from the point where the signal is generated. A technician typically moves the signal generating apparatus from point-to-point on the network so that the frequency response of the network can be mapped for various positions over the network. If a problem is discovered, the technician may attempt to correct it by installing an equalizer at an appropriate location, for example.

A cable network suitable for two-way data communications should have a fairly linear response (increases in transmitted power cause a proportional increase in measured power at the X point). Such network should also have a relatively flat frequency response (the detected power level is relatively uniform over the frequency range being tested). Further, a compliant system should have relatively low noise levels. In specific approaches, compliance with these criteria may be determined by comparison of the network response against a threshold peak to valley (PtV) value across the upstream frequency range, a threshold carrier to noise (C/N) ratio, and/or an amplitude response factor.

One major drawback to the current method of testing a cable network for compliance is that the testing cannot be conducted while live two-way communication is taking place. Or at least the testing cannot be conducted over the entire upstream frequency range. At any given time during live communication, a particular frequency band is used for upstream communications. If the testing takes place in this band, the live data may become unreadable. As a result, complete testing, across the entire upstream frequency range, cannot be conducted while the cable network is in service. Of course, the cable service can be temporarily halted, but this results in a loss of revenue to the cable company and associated service providers.

Because complete testing cannot be easily conducted while a cable network is in service, the network may drift toward marginal performance and even become partially or wholly unusable without forewarning. Thus, it would be desirable to have an improved testing method and/or system that allowed complete cable network tests to be conducted without disrupting the cable service.

SUMMARY OF THE INVENTION

The present invention provides a system and method for testing, and thereby maintaining, a cable network during normal operation. It accomplishes this by interleaving test signals with live data traffic. Installed cable modems are used to generate the test signals. During live communication, such modems send upstream data at allotted time periods. Periodically, there are time slots when no modem is transmitting on the network. During these times, in accordance with this invention, specific modems may be directed to transmit specific test signals. A controller such as a cable modem termination system directs specific modems to transmit signals at defined frequencies and powers during specific time slots. In this manner, the system can monitor the frequency response of the cable network at various locations, and thereby determine "on-the-fly" when maintenance or modification is required.

This invention provides at least three advantages over prior techniques for testing and maintaining cable networks. First, it does not require specialized maintenance/test apparatus. Instead, it employs equipment intended for data transport (e.g., cable modems). Second, testing may be automated so that technicians need not travel to remote sites on the cable plant and there install and monitor testing apparatus. They also need not do their own diagnosis with incomplete data as a much larger location sampling can take place. Third, the testing may be conducted without disrupting cable network service.

One specific aspect of the invention pertains to methods of testing a cable network while allowing transmission of live data traffic. This method may be characterized by the following sequence of operations: (a) selecting one or more cable modems on the cable network; (b) identifying a group of time increments during which cable modems on the network are not scheduled to transmit data; (c) instructing a first one of the one or more cable modems to send a first signal of a first frequency and power during a first one of the time increments; (d) measuring the power of the first signal received at a specified location on the cable network; (e) instructing the first cable modem to send a second signal of a second frequency during an available time increment; (f) measuring the power of the second signal received at the specified location on the cable network; and (g) recording a power versus frequency spectrum of the first modem at least the first and second frequencies. Of course, the system may generate a detailed spectrum by measuring the power of a plurality of additional test signals generated by the first cable modem at a plurality of additional frequencies. And these additional signals may be sent during a plurality of additional time increments. Typically, the process will, at the specified location, measure and record a frequency versus power spectrum of one or more other cable modems during available time increments.

Prior to undertaking the testing, the system may need to identify a specific range of frequencies at which the one or more cable modems are to send signals. Preferably, this range spans at least a substantial portion of the upstream frequency bandwidth allotted to cable modems. Testing in accordance with this invention becomes particularly interesting when the range of frequencies includes one or more frequencies in a frequency sub-band over with cable modems on the cable network are currently sending data.

Prior to undertaking the testing, the system may need to identify specific cable modems required to send test signals. In one embodiment, such modems are selected by first identifying separate geographic regions of the cable network for testing and then selecting at least one cable modem at each geographic location.

In addition to gathering raw spectra, the testing process may obtain statistical data pertaining to particular modems or their associated portions of the network. Such data includes, but is not limited to, variation over time (e.g., historical trends). In one embodiment, this involves requiring a modem to repeatedly transmit a particular signal (at a specified frequency). In one specific embodiment, this process involves (i) determining a deviation between the measured power of the first signal, at the specified location, and an expected value of the measured power at that location; (ii) instructing the first cable modem to send another signal at the first frequency, but this time at a power adjusted from the first power by the magnitude of the deviation; and (iii) measuring and recording the power of the other signal, at the specified location on the cable network. This process may be repeated a sufficient number of times to obtain the desired statistical data.

As mentioned, the testing may be used to determine whether a cable network is in compliance with a cable network standard. One such standard is DOCSIS, a standard for transmission of data over HFC cable networks. In accordance with this standard, the operation of instructing the first cable modem to send a first signal involves sending a DOCSIS "ranging request" to the first cable modem.

Another aspect of this invention provides a cable network headend that allows testing of the cable network. Such headend may be characterized as including the following features: (a) an amplitude detector that can measure, at a specified location in the cable network, the amplitude of a signal received from a cable modem in the cable network; (b) a MAC layer unit for identifying a group of time increments during which cable modems on the cable network are not scheduled to transmit data; and (c) test logic unit for instructing a cable modem on the cable network to send signals at least two different frequencies during one or more of the time increments and for directing the headend to record the power of said signals at said different frequencies as detected by the amplitude detector. The headend may often include other elements such as an upstream receiver in communication with the amplitude detector and a downstream transmitter in communication with the MAC layer means. It may also include a frequency error detector that is analogous to the amplitude detector.

In a preferred embodiment, the test logic unit selects one or more cable modems in the cable network to generate signals at multiple frequencies, and those cable modems reside at separate geographic regions. Further, the test logic unit may select the frequencies at which the cable modem sends signals such that at least one of the signals is within a frequency band over which cable modems on the cable network are currently sending data. Still further, the test logic unit may determine, from one or more power versus frequency spectra of one or more of the cable modems in the cable network, whether the cable network complies with a cable network standard (e.g., DOCSIS).

These and other features and advantages of the invention will be described in detail below with reference to the associated drawings.

DETAILED DESCRIPTION OF THE PREFERRED EMBODIMENTS

Since the late 1980's the cable TV industry has been upgrading its signal distribution and transmission infrastructure. In many cable television markets, the infrastructure and topology of cable systems now includes fiber optics as part of its signal-transmission component. The use of fiber optics has accelerated the pace at which the cable industry has taken advantage of the inherent two-way communication capability of cable systems. The cable industry is now developing reliable and efficient two-way transmission of digital data over its cable lines at speeds orders of magnitude faster than those available through telephone lines, thereby allowing its subscribers to access digital data for uses ranging from Internet access to cable commuting. While cable TV systems have always had the ability to send data downstream, i.e. from a cable TV hub to subscribers' homes, cable TV systems can now send data upstream, i.e. from individual subscribers' homes to the hub. This new upstream data transmission capability enabled cable companies to use set-top cable boxes and provided subscribers with "pay-per-view" functionality, i.e. a service allowing subscribers to send a signal to the cable system indicating that they want to see a certain program.

Figure 1:
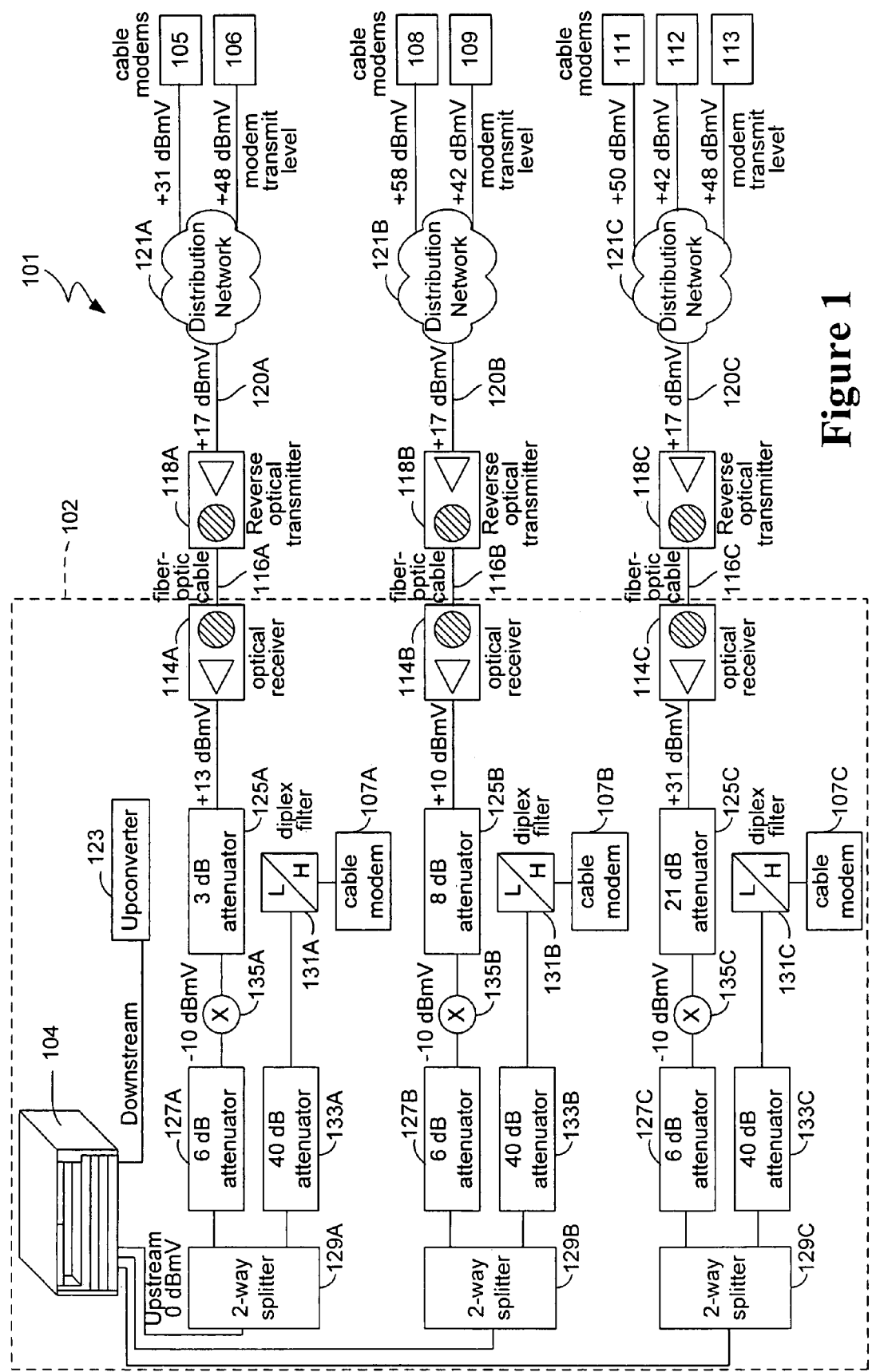
FIG. 1 is a block diagram of one example of a cable network system that may be tested in accordance with this invention.

FIG. 1 is a block diagram of a two-way hybrid fiber-coaxial (HFC) cable system 101 including cable modems and a cable modem termination system (CMTS) 104. The depicted system includes three separate distribution networks 121A-C connected to three different upstream ports of CMTS 104.

The described HFC cable system may be used for two-way transmission of digital data such as Internet data, digital audio, or digital video data, for example, from one or more external sources (not shown) available through CMTS 104. The digital data is carried over radio frequency (RF) carrier signals. Cable modems convert digital data to a modulated RF signal and convert the RF signal back to digital form. The conversion is done at two points: at the subscriber's home by a cable modem and by a CMTS located at the head end. The CMTS converts the digital data to a modulated RF signal that is carried over the transmission system, which is, in one embodiment, a set of fiber and coaxial lines to the subscriber premises. The cable modem then demodulates the RF signal and feeds the digital data to a computer. On the return path, the operations are reversed. The digital data is fed to the cable modem, which converts it to a modulated RF signal (it is helpful to keep in mind that the word "modem" is derived from modulator/demodulator). Once the CMTS receives the RF signal, it demodulates it and transmits the digital data to an external source.

The main distribution component of HFC cable system 101 is a hub 102 (also referred to as a "headend") which can typically service about 40,000 subscribers or end-users. Hub 102 contains several components shown in FIG. 1. One component is the cable modem termination system, or CMTS, 104 for transmitting data (sending it downstream to users) and receiving data (receiving upstream data originating from users). From CMTS 104, separate downstream and upstream lines are used for sending and receiving data. Downstream signals pass through an upconverter 123 and onto other components on their way to destination cable modems. Upconverter 123 converts the frequency at which downstream signals are carried from a channel and service-independent intermediate frequency to a channel specific radio frequency. The downstream RF signals are broadcast over the cable plant and ultimately received at the cable modems. This figure shows cable modems as blocks 105, 106, 107A-C, 108, 109, 110, 111, 112, and 113. The components on the downstream path between upconverter 123 and the cable modems are not depicted.

On the upstream path, data from some of the cable modems enters cable plant 101 via distribution networks 121A-C. Each distribution system will have its own topology, which varies as a function of the local neighborhood geography, the number and type of cable modems in the distribution network, etc. As a result signals from different modems on a given distribution network are attenuated by different amounts on the upstream path.

Data from modems on the distribution networks is typically transmitted as electrical signals over conventional coaxial cables 120A-C, also referred to as a trunk lines. In some instances, coaxial trunk lines are being replaced with optical fiber. Data traveling upstream from trunk lines 120A-C reaches fiber nodes 118A-C, which convert the electrical signals to optical signals that can be transmitted over fiber optic cables 116A-C. Typically fiber optic cable 116A-C contains pairs of cables carrying data in opposite directions. These cables typically run for as long as 100 km and are used to carry data for most of the distance between the neighborhood distribution networks and hub 102.

Hub 102 can typically support up to 80 fiber nodes and each fiber node can support up to 500 or more subscribers. Thus, there are normally multiple fiber optic cables emanating from hub 102 (only three are shown to simplify the illustration). Note that in many systems, fiber capacity (and consequently the number of potential subscribers) is increasing because dense wave-division multiplexing technology is being employed. DWDM is a technique for transmitting data via more than one wavelength of light on the same fiber.

Data from fiber optic cables 116A-C enters hub 102 via fiber transceivers 114A-C used to convert optical signals to electrical signals for processing in hub 102. Focusing on the top distribution network 121A, upstream data from optical transceiver 114A passes through attenuators 125A and 127A before passing through a splitter 129A and onto a port of CMTS 104. As shown, parallel paths exist for distribution networks 121B and C.

To allow verification of the downstream path, hub 102 includes diplex filters 131A-C, which are connected to the downstream path (not shown) and to attenuators 133A-C. Cable modems 107A-C serve as part of the verification system. They are attached to diplex filters 131A-C to allow the CMTS to confirm that a modem can actually transmit on the associated distribution network. Thus, the network subsystem given by diplex filters 131A-C and cable modems 107A-C assist in verifying the operation of cable plant 101 and in isolating problems that arise on that plant. As shown, upstream data from the modems passes through one of diplex filters 131A-C and then onto one of attenuators 133A-C before entering one of splitters 129A-C.

As noted, the distribution networks have various topologies. Topological differences in paths from various modems to hub 102 result in different attenuation levels. Yet, CMTSs are designed to work at single power level. For example, CMTS 104 may be designed to receive signals centered at 0 dBmV amplitude. If all modems transmitted at the same power level, some signals received at CMTS 104 would be well above the required power level and some would be well below that level. To account for the effects of topological variations in the distribution networks, many cable systems require that different modems transmit at different power levels. The particular transmission power levels are selected to cause all signals to arrive at the CMTS with the same power level. The DOCSIS standard for transmission defines a procedure for adjusting modem transmission power such that the received power at the headend is constant. This procedure, called ranging, is described below. Note that DOCSIS is an interim standard establishing the protocol for two-way communication of digital data on cable systems defined and adopted by a consortium of industry groups, and is widely-followed in the field of cable modem data communication.

FIG. 1 illustrates a hypothetical set of modem power levels chosen such that transmissions from all modems will reach CMTS 104 centered at 0 dBmV. As shown, transmissions from modem 105 are made at +31 dBmV and those from modem 106 are made at +48 dBmV. This difference results from different attenuation levels on the paths from these modems through distribution network 121A. Signals from modem 105 are less attenuated than signals from modem 106. In the end, all transmissions, regardless of source modem, reach optical transmitter 118A at +17 dBmV. Similar results are illustrated for distribution networks 121B and 121C and their associated cable modems.

Because signals from all modems on a given distribution network experience the same attenuation while passing through the fiber optic and hub sections of the network, no further modem specific adjustments are required. As shown in FIG. 1, transmissions passing through optical components 118A, 116A, and 114A lose 4 dB so that they enter hub 102 as +13 dBmV electrical signals. Other optical sections have different effects. For example, optical components 118B, 116B, and 114B together amplify signals by 1 dB and optical components 118C, 116C, and 114C together amplify signals by 14 dB. Because the different fiber optic segments attenuate/amplify by differing amounts, hub attenuators 125A-C attenuate by different amounts so that all transmissions, regardless of source modem or fiber node, reach the CMTS at the same power level. Thus, all signals upstream from attenuators 125A-C should have the same power level (at the same position vis-à-vis CMTS 104). As shown, all transmissions leave attenuators 125A-C at +10 dBmV.

As mentioned, a hub can measure all signals at an "X" point. This point should be chosen at a location where all transmissions are expected to have the same power level with respect to the CMTS—regardless of fiber node or source modem. More precisely, the X point should be chosen, with respect to a CMTS amplitude detector location, so that power level is linearly related in a known manner that is consistent across all nodes feeding the CMTS. Usually, the X point will be at or proximate the CMTS. One common location is on a line card in the CMTS. In FIG. 1, the X point (indicated by reference numbers 135A-C) for each CMTS input port is located between attenuators 125A-C and attenuators 127A-C, respectively. At these points, the power level is expected to be +10 dBmV. Amplitude detectors may be positioned at these locations (or in the CMTS) so that they can measure power levels during testing. Note that in FIG. 1, the X points could be chosen to be any locations upstream of attenuators 125A-C.

Figure 2:
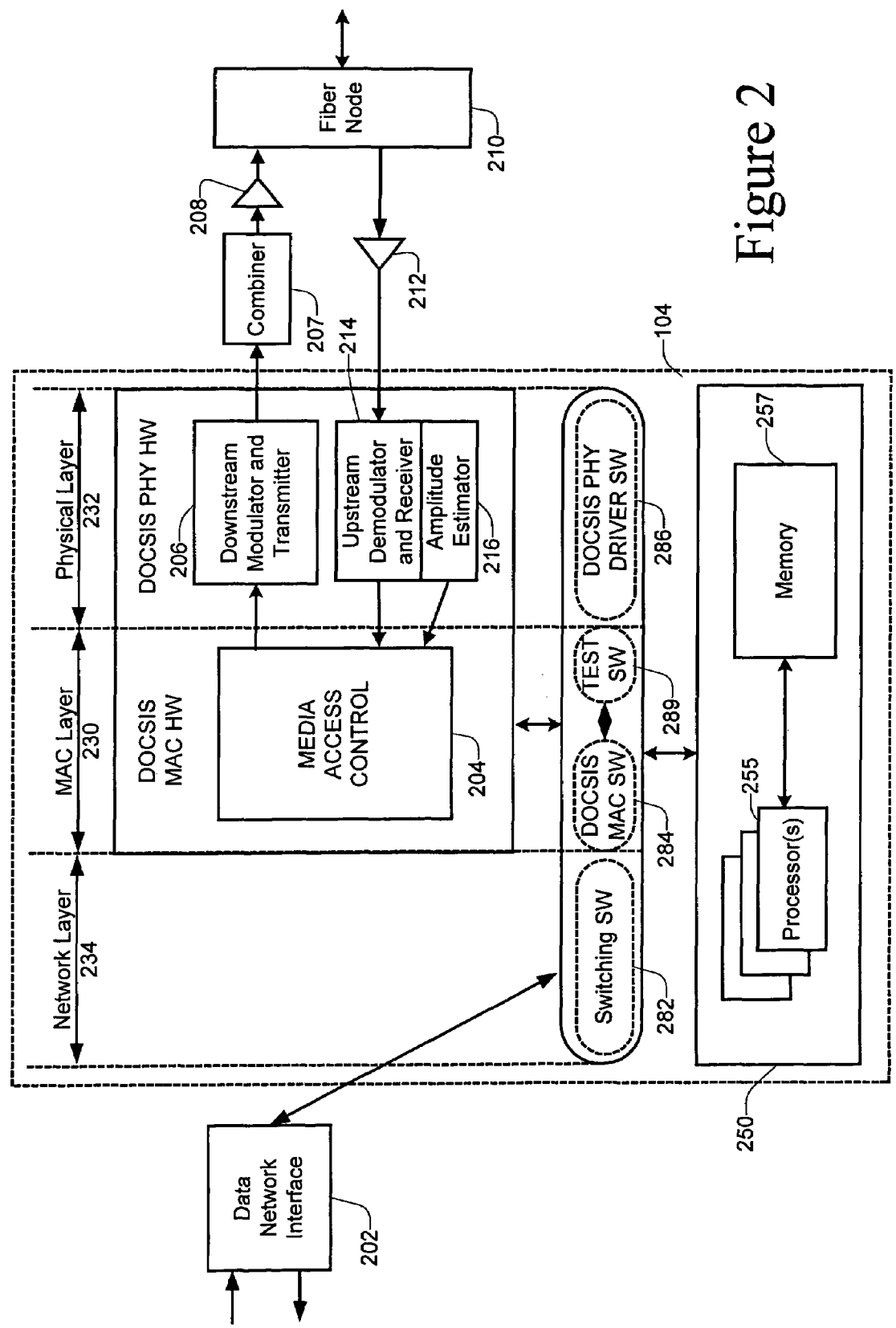
FIG. 2 is a block diagram of a cable modem termination system that may be used to implement the present invention.

Some of the functions of CMTS 104 include (1) interfacing to a two-way data communications network; (2) providing appropriate media access control or MAC level packet headers for data on the RF interface of a cable system; and (3) modulating and demodulating the data to and from the cable system. As mentioned, the cable modem termination system may also implement some or all of the testing methods of this invention. FIG. 2 presents a block diagram showing hardware and software that may be employed in CMTS 104. As shown, a Data Network Interface 202 provides an interface between an external data source and the cable system. External data sources transmit data to data network interface 202 via optical fiber, microwave link, satellite link, or through various other media. Interface 202 may include hardware and/or software for interfacing to various network types such as, for example, Ethernet, ATM, frame relay, etc. as appropriate.

In the specific embodiment as shown in FIG. 2, CMTS 104 provides functions on three network layers including a physical layer 232, a Media Access Control (MAC) layer 230, and a network layer 234. Generally, the physical layer is responsible for receiving and transmitting RF signals on the cable plant. Hardware portions of the physical layer include a downstream modulator and transmitter 206 and an upstream demodulator and receiver 214. The physical layer also includes software 286 for driving the hardware components of the physical layer.

Upstream optical data signals (packets) arriving via an optical fiber node 210 are converted to electrical signals by a receiver 212 (see receivers 114A-C of FIG. 1). Next, the upstream information packet (RF electrical signals) is demodulated by the demodulator/receiver 214 and then passed to MAC layer block 230. A primary purpose of MAC layer 230 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses of specific modems created by a MAC layer block 230 in CMTS 104. Note that the cable modems also include MAC addressing components. In the cable modems, these components encapsulate upstream data with a header containing the MAC address of the destination modem.

MAC layer block 230 includes a MAC hardware portion 204 and a MAC software portion 284, which together serve the above-described functions. In a preferred embodiment, MAC hardware portion 204 is distinct from the router's general purpose microprocessor and is dedicated to performing some MAC layer functions.

After the upstream information has been processed by MAC layer block 230, it is then passed to network layer block 234. Network layer block 234 includes switching software 282 for causing the upstream information packet to be switched to an appropriate data network interface on data network interface 202. When a packet is received at the data network interface 202 from an external source, the switching software within network layer 234 passes the packet to MAC layer 230. MAC block 204 transmits information via a one-way communication medium to downstream modulator and transmitter 206. Downstream modulator and transmitter 206 takes the data (or other information) in a packet structure and converts it to modulated downstream frames, such as MPEG or ATM frames, on the downstream carrier using, for example, QAM modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 207. An optical converter 208 converts the modulated RF electrical signals to optical signals that can be received and transmitted via Fiber Node 210 to the cable modem hub.

It is to be noted that alternate embodiments of the CMTS (not shown) may not include network layer 234. In such embodiments, a CMTS device may include only a physical layer and a MAC layer, which are responsible for modifying a packet according to the appropriate standard for transmission of information over a cable modem network. The network layer 234 of these alternate embodiments of CMTS devices may be included, for example, as part of a conventional router for a packet-switched network.

In a specific embodiment, the network layer of the CMTS is configured as a cable line card coupled to a standard router that includes the physical layer block 232 and MAC layer block 230. Using this type of configuration, the CMTS is able to send and/or receive IP packets to and from the data network interface 202 using switching software block 282.

As shown in FIG. 2, CMTS 104 includes a central hardware block 250 including one or more processors 255 and memory 257. These hardware components interact with software and other hardware portions of the various layers within the CMTS. They provide general purpose computing power for much of the software. Memory 257 may include, for example, I/O memory (e.g. buffers), program memory, shared memory, etc. Hardware block 250 may physically reside with the other CMTS components. In one embodiment, the software entities 282, 284, and 286 are implemented as part of a network operating system running on hardware 250. Further, the testing functions of this invention are preferably implemented in software as part of the operating system. In FIG. 2, such software is represented by block 289. Of course, the testing logic could reside in hardware, software, or some combination of the two.

Note that the term "testing," as used herein, refers to any type of testing that characterizes one or more portions of a cable network. Preferably, the testing covers many different regions of the cable network. Preferably, it also provides power versus frequency spectra for various points or sections on the cable network.

In one embodiment, testing is conducted as follows. Testing software 289 is closely associated with MAC layer software 284. It determines that a particular modem should generate a test signal at a particular amplitude and frequency. With the aid of conventional MAC layer logic, the test software schedules a time when the test signal is to be sent. It also uses the MAC layer logic to inform the modem (likely by the ranging protocol if DOCSIS is used) of the particular frequency and power at which to transmit the test signal. When the modem replies, an amplitude estimator 216 (associated with upstream demodulator and receiver 214) measures the amplitude and frequency of the signal. This information is then provided to MAC layer logic 230, which relays it to test software 289. That software may then analyze the data to determine if there is a problem. Before it can make an assessment, it may have to take in enough data to identify spectra of multiple modems in the network. As discussed below, these spectra may be stored in the form of a logical table. In an alternative embodiment, test software 289 outputs the results of the testing (with or without analyzing the results). In this embodiment, some form of an output device such as a monitor or printer attaches to CMTS 104.

As indicated, MAC layer logic block 230 may control the time slot allocation and ranging procedures required by the DOCSIS standard for transmission of data. The need for these procedures can be understood as follows. On the downstream cable data channel, data is broadcast (or multicast) by a CMTS to cable modems served on that downstream channel. However, sending upstream data is not so simple. Upstream transmission is complicated by the fact that the upstream path is used as a multiple access channel shared by the large group of cable modems (on that channel) to communicate with the CMTS. To prevent collisions, the upstream channel is time-slotted and cable modems need to contend for gaining access to the CMTS in this shared channel. This time slotting procedure is sometimes referred to as Time Division Multiple Access (TDMA).

Typically, time slots are scheduled using a "minislot" as the basic unit of scheduling. The CMTS remotely schedules each and every minislot on the upstream channel. Some contiguous minislots are grouped together as a unicast data slot meant to be used by a specific cable modem for sending its data upstream. Some minislots are marked as contention slots that can be used by any cable modem to send ranging/bandwidth requests upstream to the CMTS. The CMTS conveys this minislot allocation information (to the set of modems sharing the upstream channel) ahead of time using bandwidth allocation "MAP messages" that are periodically broadcast on the downstream channel.

Figure 3:
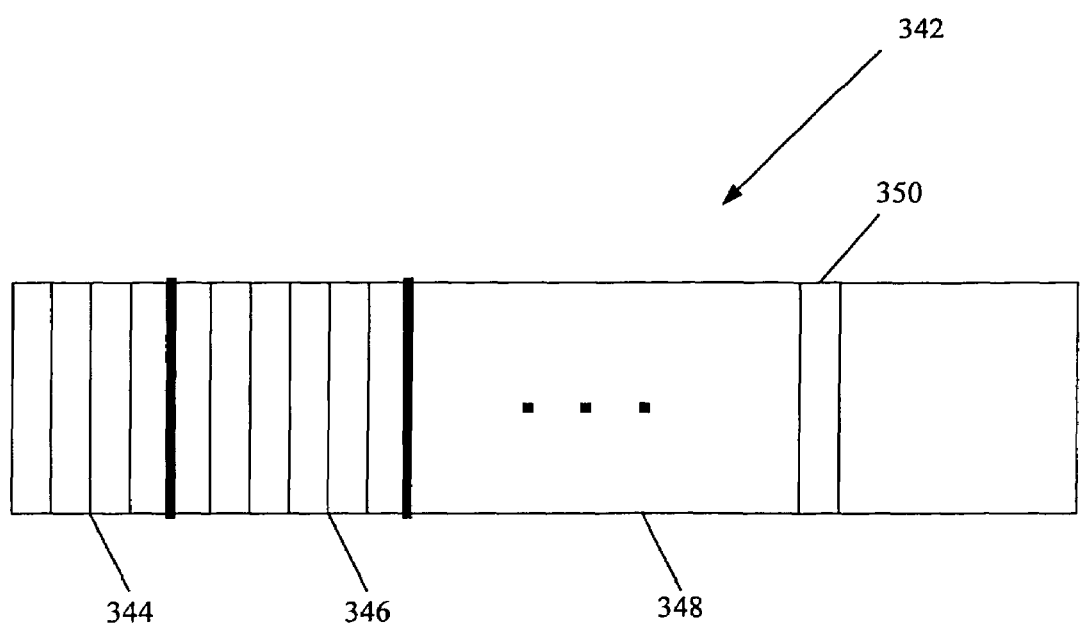
FIG. 3 is a block diagram depicting the structure of a MAP message suitable for use with the present invention.

FIG. 3 illustrates a sample MAP message 342 that may be used with the present invention. MAP message 342 includes various time slots or groups of time slots representing grants for upstream transmission to various cable modems in the plant. In the example shown, a group of minislots 344 have been granted to a first cable modem. Similarly, a group of later time slots 346 have been granted to a second cable modem. The granted time slots may be of arbitrary length from a few tens of microseconds to a few milliseconds. Other slots for other cable modems may be specified in the remainder (indicated by reference numeral 348) of MAP 342. Now, in accordance with this invention, the CMTS may decide to set aside particular minislots for testing. For example, a minislot 350 may be reserved for testing. Specifically, the first cable modem may be required to send a test signal at its optimum power level (as determined by the topology of the distribution network, for example) and 18 MHz during the time period designated by minislot 350. Further, all minislots 346 may be set aside for the second cable modem to send test signals at its optimum power level and at a frequency of 9 MHz.

Figure 4:
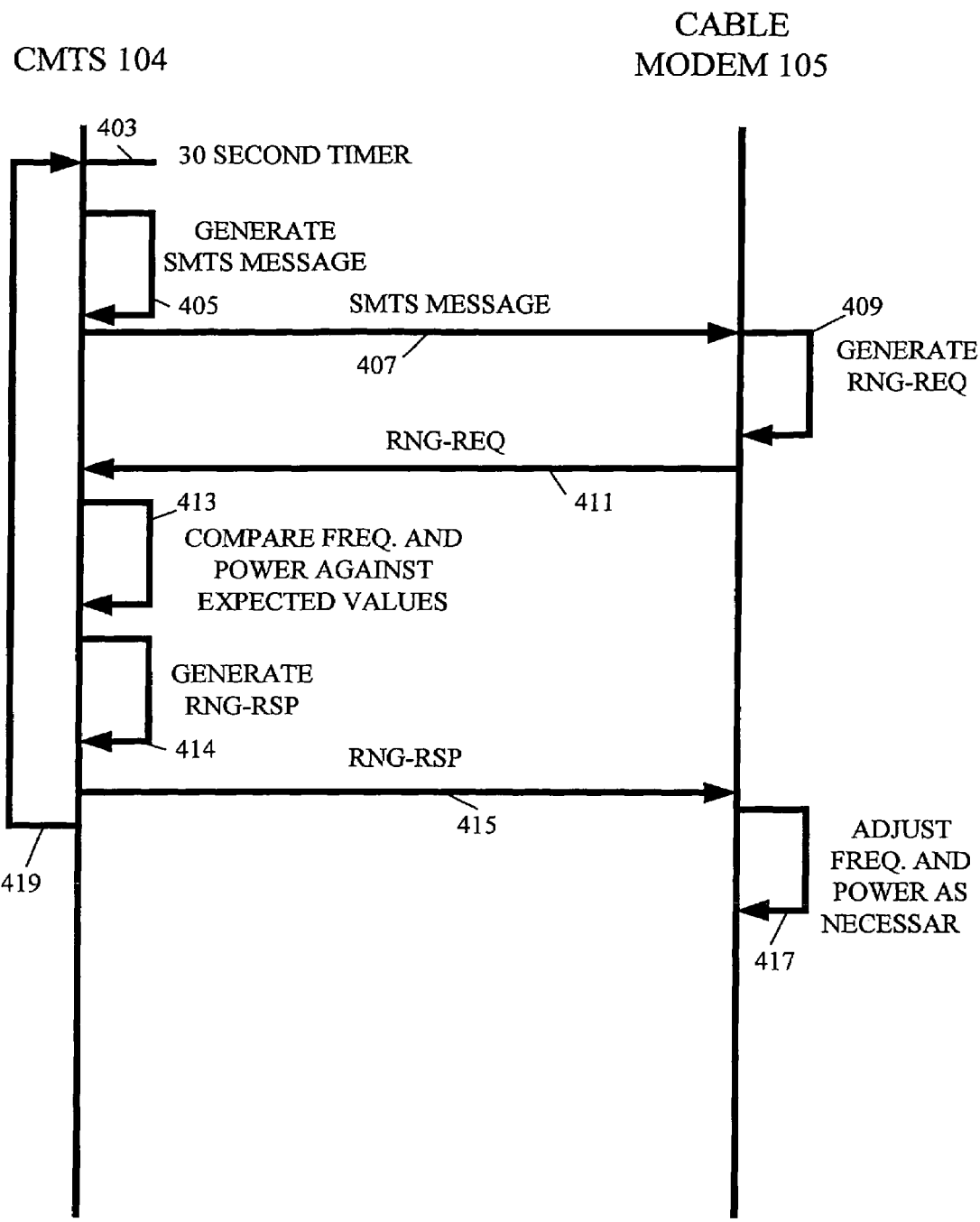
FIG. 4 is an interaction diagram illustrating a DOCSIS ranging procedure allowing the network to determine the performance of individual cable modems.

FIG. 4 presents an interaction diagram depicting the interactions between a cable modem termination system 104 and a cable modem 105 during ranging, in accordance with a cable network standard such as DOCSIS. DOCSIS ranging may be understood as follows. Among the time slots mapped by the CMTS is a slot called the "station maintenance" time slot (SMTS). In many implementations, each cable modem receives at least one SMTS every 30 seconds. When a cable modem receives an SMTS it must transmit a ranging request (RNG-REQ) message which is used by the CMTS in order to determine if the cable modem is operational and to maintain the link to that cable modem. If the cable modem does not respond to the SMTS after 16 tries the cable modem is assumed to be off.

As illustrated in FIG. 4, the procedure is initiated by the expiration of a 30 second timer as illustrated at 403. Note that the 30 seconds is an arbitrary value and may be varied from implementation to implementation. When CMTS 104 determines that the timer has expired at 403, it generates and sends an SMTS message at 405. That SMTS message then travels over the cable network at 407 where it is received by destination cable modem 105.

Upon receipt of an SMTS message, cable modem 105 generates a standard ranging request message at 409. The cable network transmits the ranging request upstream, back to the headend at 411.

Upon receipt of the ranging request, CMTS 104 compares the received frequency and amplitude of that request against an expected frequency and amplitude at 413. Depending upon whether CMTS 104 identifies any significant deviation between the actual and expected frequency and amplitude, the CMTS may decide to abort the service of cable modem 105. This would occur if the frequency and/or power (or some combination thereof) deviated from the expected values by more than a threshold value. This threshold may vary from standard to standard and implementation to implementation. Assuming that the deviation falls within a safe threshold, CMTS 104 will generate a ranging response message at 414 and send that message back downstream to cable modem 105 at 415.

In accordance with the DOCSIS standard, the ranging response message will include various pieces of information including a time offset, a frequency error, a power error, and a keep alive message. The keep alive message instructs the cable modem to remain alive and continue transmitting data as necessary. The time offset indicates how long the message from the cable modem took to travel to the CMTS 104. The frequency and power errors are deviations in the detected frequency and power from expected values. When cable modem 105 notes these errors, it will adjust its frequency and power as necessary to compensate for the deviation(s). See 417. After the 30 second timer has once again expired, the process begins again as indicated by the return of process control at 419.

Figure 5:
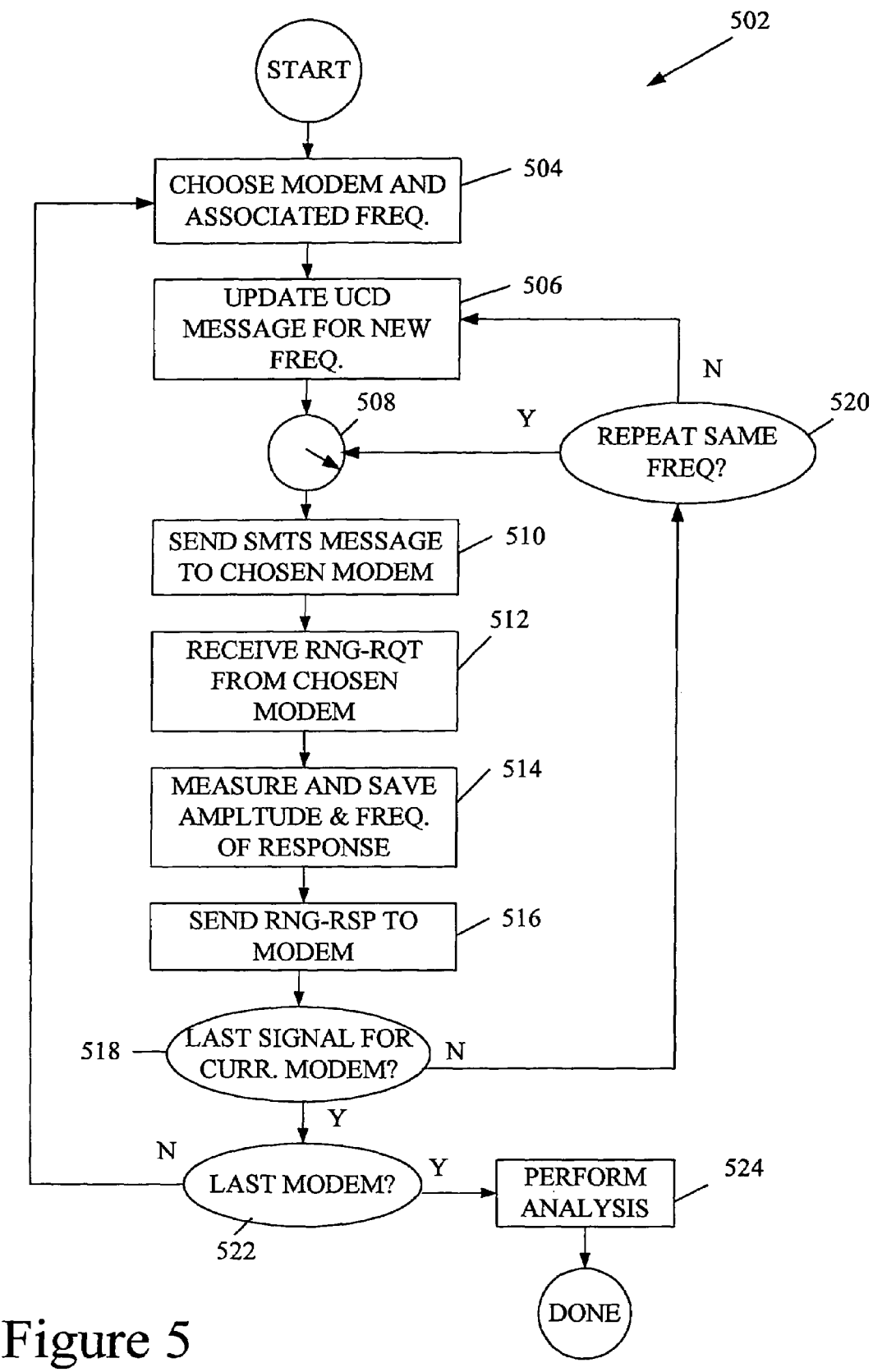
FIG. 5 is a process flow diagram illustrating a sequence of operations that may be undertaken by a cable network headend in accordance with an embodiment of this invention.

FIG. 5 is a process flow diagram illustrating how a CMTS implemented in accordance with this invention may test a cable network. A process 502 begins at a block 504 with the CMTS choosing a first modem and a first associated frequency for testing. The CMTS must then notify that modem that it is to send a signal at the specified frequency. It is entirely possible that that frequency is different from the frequency at which the modem and its peers are currently transmitting data upstream. Numerous procedures may be employed to cause the modem to transmit at the new "test" frequency. Using the DOCSIS standard, the CMTS may send an update UCD message through a new frequency. UCD refers to "Upstream Channel Descriptor" which instructs the modem and at least some of its peers to begin transmitting at a new frequency identified in the UCD message. This operation is depicted at block 506 in FIG. 5.

Typically, the remaining modems should continue transmitting live data at the original frequency that was in use prior to the UCD message. This may be accomplished by sending a second UCD message, subsequent to receipt of the test signal(s). This second UCD message would instruct the modems to return to the original frequency. In an alternative approach, a modified UCD message (or other message format) contains instructions specific to the test modem, and does not affect the other modems. Such message would instruct only the test modem to change its frequency. In some cases, depending upon the test frequency, the test modem and its peers will all transmit live data traffic at the newly identified frequency.

As mentioned in conjunction with the discussion of FIG. 4, the DOCSIS standard issues new SMTS messages every 30 seconds or so. A 30 second timer is indicated at 508 of process 502. At the next 30 second time trigger, CMTS 104 issues an SMTS message to the modem specified at 504. See block 510. Thereafter, the test modem will reply with a ranging request message (assuming that the network is proceeding under the DOCSIS approach). Due to the update UCD message sent by CMTS, the test modem's response should be a signal having the specified test frequency. At 512, the CMTS receives the ranging request message from the selected modem. It then measures the amplitude, frequency, and timing offset of the request at 514. In the embodiment depicted in FIG. 2, the amplitude is measured by amplitude estimator 216 (which also measures frequency and timing offset) associated with upstream receiver 214. Note that after the CMTS measures the amplitude, it may also add the amplitude measurement to a frequency response table that it is generating. Such table will be described in more detail with reference to FIG. 6.

With the measured amplitude in hand, the CMTS (preferably through the operations of software blocks 284 and 289 shown in FIG. 2) determines whether the amplitude and/or frequency of the ranging response from the modem deviates from an expected value. In a typical cable system, as explained above, the distribution network is designed so that signals from all cable modems, no matter how geographically disparate, arrive at the optical transmitter having a single amplitude (e.g., 10 dBmV). After the signal passes upstream through the optical and other components to the CMTS, it should have a specified amplitude. However, due to the myriad of dynamic changes taking place in the cable network, the signal may vary from the expected amplitude by some amount. In the case of the testing described herein, the CMTS determines the magnitudes of deviations associated with particular frequencies for various segments or points of the cable network.

In one embodiment of this invention, the CMTS simply measures and records a deviation from the expected amplitude at desired frequency and incorporates that in part of a spectrum for the modem or network segment of interest. However, using the DOCSIS standard, additional statistical information can be obtained about the modem or its associated network section. For example, the modem can be instructed to repeatedly transmit at the same frequency. If the amplitude varies during successive ranging requests, it may indicate that there is a fault in the network.

Returning to process 502 of FIG. 5, the CMTS sends a ranging response to the test modem at 516. Using the DOCSIS standard, the response will specify a change in amplitude corresponding to the detected deviation between the amplitude of the last received signal from a test modem and the amplitude expected by the CMTS. The test modem is expected to apply this correction before sending its next ranging request.

After sending the ranging response and updating the frequency response table, the CMTS will determine whether it has reached the last test signal for the modem under consideration. See decision block 518. Assuming that other signals are required to complete the analysis (using the modem under consideration), the CMTS next determines whether the modem under consideration should send another signal at the same frequency. See decision block 520. As mentioned, it may be desirable to cause the test modem to transmit multiple signals at the same frequency to identify faults or to gain statistical information such as the mean and standard deviation of the amplitude variation. Assuming that the CMTS requires that the modem generate another signal on the same frequency, process control returns to 508 where the system awaits expiration of the next timer increment (e.g., the next 30 second trigger). From there, the CMTS issues another SMTS message at 510, receives the ranging request at 512, and sends a ranging reply at 516 as necessary.

Assuming on the other hand that no further testing is required at the frequency of interest, the CMTS must instruct the modem to move to a different frequency before transmitting the next test signal. If this is the case, decision 520 is answered in the negative. At that point, process control returns to 506 where the system sends an update UCD message for the new frequency. Then, at the expiration of timer 508, the next SMTS message is issued and the modem responds with a ranging request at the new frequency of interest. The received amplitude is measured at 514 and any deviation from expected value is recorded in the frequency response table. This allows a power spectrum for the cable modem under test to be generated. This CMTS may also send a ranging response to the modem at that point.

In the above-described manner, the modem under test is caused to issue test signals at a series of frequencies. From these signals, the CMTS may generate a power versus frequency spectrum for the test modem. This may provide insight into the behavior of the specific modem and/or the region of the cable network that it is associated with. Note that in alternative implementations, the CMTS may probe multiple modems concurrently at one or more frequencies. In other words, it may obtain data points for the power spectrum of a second and possibly third modem before the spectrum is completed for a first modem.

After the last test signal of the last frequency is considered for the modem under consideration, decision block 518 is answered in the affirmative. At that point, the CMTS must determine whether the current modem is the last modem to be considered. See decision block 522. If additional modems are to be considered, process control returns to 504 where the next modem is chosen together with a first test frequency for that modem. Thereafter the process continues as described above.

Ultimately, all the modems identified for testing are considered and their power versus frequency spectra recorded. At that point, decision 522 is answered in the affirmative. The CMTS may then perform an analysis of the completed frequency response table at 524. Alternatively, the frequency response table may simply be output and an appropriate professional conducts the analysis. Either the CMTS logic or the cable network professional analyzes the frequency response table to identify any region of the cable network that may be moving towards marginal performance. When such a region is localized, the CMTS may conduct further, more stringent, testing of that region of the network. For example, it may test additional modems in that region to determine whether the marginal performance is the result of a single modem or a wider problem in the local distribution network. Ultimately, or in addition, a technician may be dispatched to the problem region where he or she can conduct further tests to specifically identify and/or correct the problem. The technician may analyze a specific cable modem with the use of a hand-held personal digital assistant or with some other functionality available at the cable modem of interest. Note that automatic analysis may be performed by test software 289 (illustrated in FIG. 2) alone or in conjunction with other software and/or hardware in the headend.

The terms "live data" and "live data traffic" used as above refer to normal upstream data communications used in a cable network. The data traffic may correspond to any kind of digital transmissions. Preferably, it refers to packetized data including packetized audio and/or video data.

Figure 6:
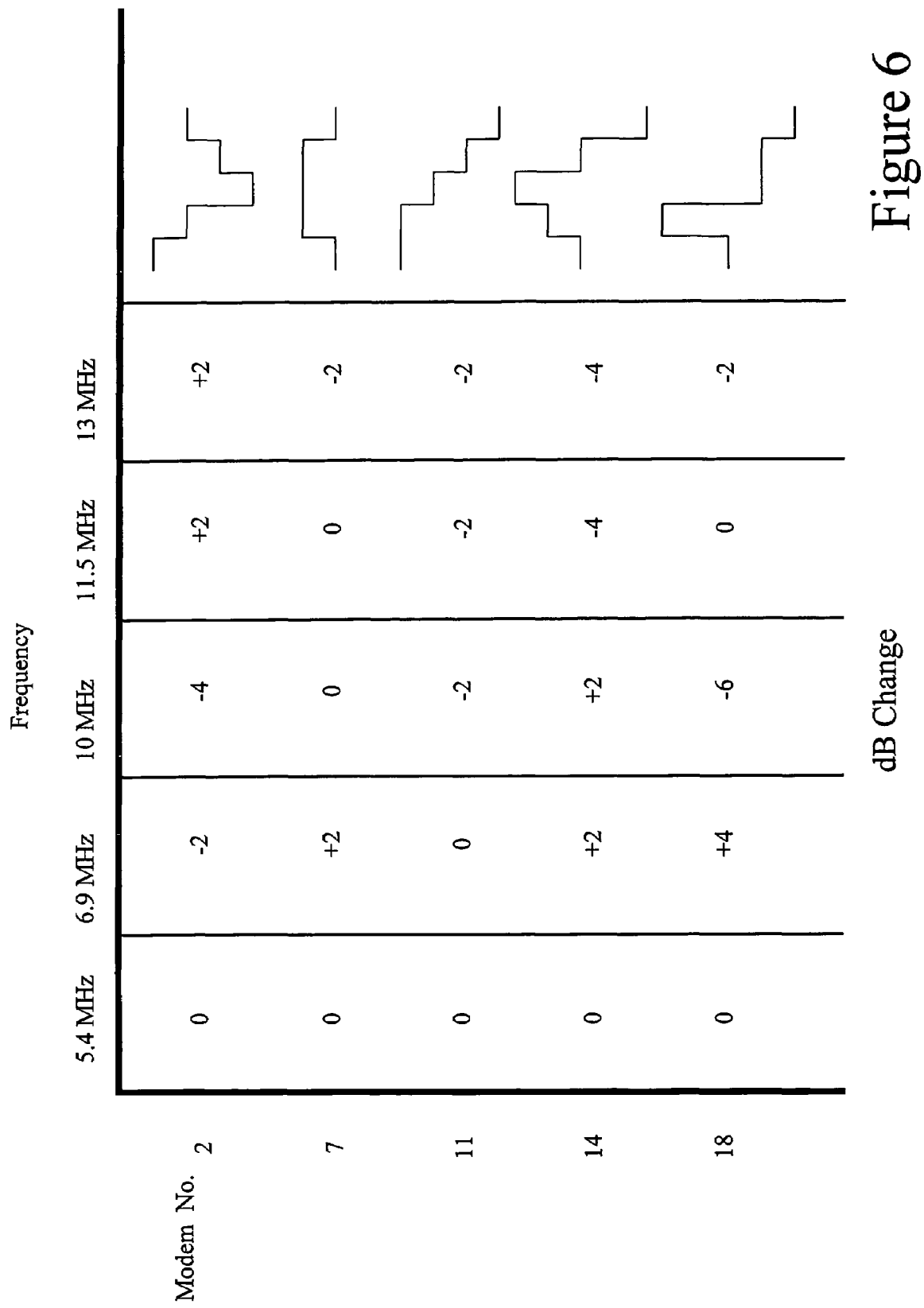
FIG. 6 is a depiction of a frequency response table that may be provided by a system of the present invention.

FIG. 6 illustrates one example of a frequency response table that may be output and/or used by the CMTS logic of the present invention. In the example illustrated in FIG. 6, the modems of interest are tested at 5 frequencies ranging from 5.4 MHz to 13 MHz. In the example presented in FIG. 6, five different modems have been tested. These are given modem numbers 2, 7, 11, 14, and 18. For each modem, starting at 5.4 MHz, the deviation of the detected amplitude from the expected amplitude is recorded. For each of the five modems under test, there is no deviation from the expected amplitude at 5.4 MHz. In this hypothetical example, the tests were started after all modems were aligned to 5.4 MHz.

At the next successively higher frequency of interest, any additional deviation, beyond the deviation measured at 5.4 MHz in the first column is recorded. For example, for cable modem number 2, the detected amplitude is 2 dB below the anticipated amplitude. For cable modem number 7, the detected amplitude is 2 dB above the anticipated level.

Following along with cable modem number 2, the next successively higher frequency has an amplitude value of "−4" dB. This indicates that the recorded amplitude is yet another 4 dB below the expected amplitude (in comparison to the next lower frequency). The amplitude at the third frequency of interest is a total of 6 dB below the anticipated amplitude for that frequency. Then, at the fourth frequency of interest, the amplitude of the signal is only 4 dB below the anticipated value (indicated by a value of "+2" in the fourth column). Finally, at the fifth frequency of interest, 13 MHz, the deviation between the actual and expected amplitudes is 2 dB to the negative (indicated by a value of "+2" in the fifth column of the frequency response table).

A graph is provided to the right-side of the frequency response table to illustrate the spectrum for cable modem 2. Similar spectra are provided for the other four cable modems of interest.

For cable modem number 7, it can be seen that there is no deviation between the actual and expected amplitude at 5.4 MHz. Then, at the next highest frequency, there is a deviation of +2 dB from the expected value. At the next two higher frequencies, the amplitude remains 2 dB above the expected value. Then, at 13 MHz, the deviation between actual and expected amplitude returns to 0. The power spectra of the other cable modems are similarly recorded.

An analysis policy may specify particular thresholds for indicating a modem (or a nearby region of the cable network) that requires further analysis and/or inspection. For example, a deviation of 6 dB from the expected amplitude may trigger such further analysis/inspection. In such case, modems 2 and 11, and possibly their respective network localities and distribution networks, would be subject to further inspection.

In alternative embodiments, tables such as the one shown in FIG. 6 may be generated for other parameters such as frequency error and timing offset. In principle, the invention applies directly to detecting these parameters in the same manner that it applies to amplitude/power detection.

Although the foregoing invention has been described in some detail for purposes of clarity of understanding, it will be apparent that certain changes and modifications may be practiced within the scope of the appended claims. For example, while the time increments discussed above generally refer to time increments specified via MAP structures in DOCSIS standard, other techniques for identifying available time slots may be employed. Further, while ranging was described above, other techniques for causing modems to transmit signals at predefined frequencies and amplitudes may be employed.

What is claimed is:

1. A method of testing a cable network, using one or more cable modems on the cable network, while allowing live data traffic at an original frequency, the method comprising:
   (a) identifying a group of time increments, associated with live data transmission, during which cable modems on the network are not scheduled to transmit data;
   (b) instructing a first one of the one or more cable modems
      (i) to send a first test signal of a first frequency at a first power during a first one of the time increments, and
      (ii) to send the first test signal while the first cable modem is on line and engaged in live data transmission at the original frequency;
   (c) measuring the power of the first test signal received at a specified location on the cable network;
   (d) instructing the first cable modem
      (i) to send a second test signal of a second frequency during an available time increment, and
      (ii) to send the second test signal while the first cable modem is on line and engaged in live data transmission at the original frequency;
   (e) measuring the power of the second test signal received at the specified location on the cable network; and
   (f) recording a power versus frequency spectrum of the first modem at at least the first and second frequencies, wherein the first and second frequencies belong to different transmission channels.

2. The method of claim 1, further comprising, at the specified location, measuring the power of a plurality of additional signals generated by the first cable modem at a plurality of additional frequencies.

3. The method of claim 2, wherein the plurality of additional signals generated by the first cable modem are sent during a plurality of additional time increments.

4. The method of claim 1, further comprising, at the specified location, measuring and recording a frequency versus power spectrum of a second one of the cable modems during available time increments.

5. The method of claim 1, further comprising;
(i) determining a deviation between the measured power of the first test signal, at the specified location, and an expected value of the measured power at that location;
(ii) instructing the first cable modem to send another test signal at the first frequency, but this time at a power adjusted from the first power by the magnitude of the deviation; and
(iii) measuring and recording the power of the other test signal, at the specified location on the cable network.

6. The method of claim 5, further comprising repeating (i)-(iii) a number of times to obtain statistical data.

7. The method of claim 1, wherein the testing determines whether the c able network is in compliance with a cable network standard.

8. The method of claim 1, wherein the testing determines whether the cable network meets DOCSIS requirements, and where instructing the first cable modem to send the first test signal comprises sending a DOCSIS ranging request from the first cable modem.

9. The method of claim 1, further comprising identifying a range of frequencies at which the one or more cable modems are to send signals.

10. The method of claim 9, wherein the range of frequencies spans at least a substantial portion of the upstream frequency bandwidth allotted to cable modems.

11. The method of claim 9, wherein the range of frequencies includes one or more frequencies in a frequency sub-band over with cable modems on the cable network are currently sending data.

12. A method of testing a cable network, using one or more cable modems on the cable network, while allowing live data traffic at an original frequency, the method comprising:
(a) identifying a group of time increments during which cable modems on the network are not scheduled to transmit data at the original frequency;
(b) instructing a first one of the one or more cable modems
(i) to send a first test signal of a first frequency at a first power during a first one of the time increments, and
(ii) to send the first test signal while the first cable modem is on line and engaged in live data transmission at the original frequency;
(c) measuring the power of the first test signal received at a specified location on the cable network;
(d) instructing the first cable modem
(i) to send a second test signal of a second frequency during an available time increment at the original frequency, and
(ii) to send the second test signal while the first cable modem is on line and engaged in live data transmission at the original frequency;
(e) measuring the power of the second test signal received at the specified location on the cable network; and
(f) recording a power versus frequency spectrum of the first modem at least the first and second frequencies,
wherein the one or more cable modems are selected by a method comprising:
identifying separate geographic regions of the cable network for testing; and
selecting at least one cable modem at each geographic location.

13. A method of testing a cable network while allowing live data traffic at an original frequency, the method comprising:

(a) instructing a first cable modem
(i) to send test signals of a first frequency and power during a first group of time increments at which times cable modems on the network are not scheduled to transmit data, and
(ii) to send the test signals of the first frequency while the first cable modem is on line and engaged in live data transmission at the original frequency;
(b) measuring and recording at least one of the frequency and the power of the test signals from the first cable modem;
(c) instructing a second cable modem
(i) to send test signals of a second frequency and power during a second group of time increments at which times cable modems on the network are not scheduled to transmit data, and
(ii) to send the test signals of the second frequency while the second cable modem is on line and engaged in live data transmission at the original frequency; and
(d) measuring and recording at least one of the frequency and the power of the test signals from the second cable modem,
wherein the first and second frequencies belong to different transmission channels.

14. The method of claim 13, wherein the test signals from the first and second cable modems are measured at a single specified location on the cable network.

15. The method of claim 13, wherein the testing determines whether the cable network is in compliance with requirements of DOCSIS.

16. The method of claim 13, further comprising identifying a range of frequencies at which the first and second cable modems are to send test signals.

17. The method of claim 16, wherein the range of frequencies spans at least a substantial portion of the upstream frequency bandwidth allotted to cable modems.

18. The method of claim 16, wherein the range of frequencies includes one or more frequencies in a frequency sub-band over with cable modems on the cable network are currently sending data.

19. A cable network headend allowing testing of the cable network, the headend comprising:
(a) an amplitude detector that can measure, at a specified location in the cable network, the amplitude of a signal received from a cable modem in the cable network;
(b) a MAC layer means for identifying a group of time increments, associated with live data transmission at an original frequency, during which cable modems on the cable network are not scheduled to transmit data; and
(c) test logic means for instructing a cable modem on the cable network
(i) to send test signals at least two different frequencies during one or more of the time increments, and
(ii) to send the test signals while the cable modem is on line and engaged in live data transmission at the original frequency and for directing the headend to record the power of said test signals at said different frequencies as detected by the amplitude detector,
wherein the different frequencies belong to different transmission channels.

20. The headend of claim 19, further comprising an upstream receiver in communication with the amplitude detector; and
a downstream transmitter in communication with the MAC layer means.

21. The headend of claim 19, wherein the test logic means selects one or more cable modems in the cable network to generate test signals at multiple frequencies.

22. The headend of claim 21, wherein the test logic means selects multiple cable modems and the individual selected cable modems reside at separate geographic regions.

23. The headend of claim 19, wherein at least one of the frequencies at which the cable modem sends test signals is within a frequency band over which cable modems on the cable network are currently sending data.

24. The headend of claim 19, wherein the test logic means determines from one or more power versus frequency spectra of one or more of the cable modems in the cable network whether the cable network complies with a cable network standard.

25. A cable network headend allowing testing of the cable network, the headend comprising:
   (a) an amplitude detector that can measure, at a specified location in the cable network, the amplitude of a signal received from a cable modem in the cable network;
   (b) one or more processors configured to (i) identify a group of time increments, associated with live data transmission at an original frequency, during which cable modems on the cable network are not scheduled to first data and (ii) to generate instructions to cause specific cable modems on the cable network to transmit test signals of specified power and frequencies and to transmit said test signals while the cable modems are on lie and engaged in live data transmission at the original frequency, which signals can be measured by the amplitude detector; and
   (c) memory coupled to the one or more processors and storing power and frequency data for the specific cable modems,
   wherein the test frequencies belong to different transmission channels.

26. The cable network headend of claim 25, further comprising a modulator/transmitter and a demodulator/receiver.

27. The cable network headend of claim 25, wherein the power and frequency data are power versus frequency spectra over a range of upstream transmission frequencies for the specific cable modems.

28. The method of claim 1, wherein operations (b) and (d) comprise interleaving the first and second test signals at the first and second frequencies and the live data transmissions at the original frequency.

* * * * *